United States Patent
Richardson et al.

[15] 3,658,307
[45] Apr. 25, 1972

[54] PROCESS AND APPARATUS FOR MELTING SLAG

[72] Inventors: Charles Delton Richardson, Frankton, Ind.; Robert John Corsentino, Jr., Temple; Oliver Maxwell Gould, Belton, both of Tex.

[73] Assignee: The Susquehanna Corporation, Fairfax County, Va.

[22] Filed: Aug. 4, 1970

[21] Appl. No.: 60,893

[52] U.S. Cl. ................................................ 263/27, 263/29
[51] Int. Cl. ...................................... F27b 19/00, F27b 1/02
[58] Field of Search .......................................... 263/27, 29, 52

[56] References Cited

UNITED STATES PATENTS

| | | | |
|---|---|---|---|
| 2,161,180 | 6/1939 | Marx | 263/27 X |
| 2,521,830 | 9/1950 | Collins | 263/29 X |

Primary Examiner—John J. Camby
Attorney—Martha L. Ross

[57] ABSTRACT

A process and an apparatus for melting rock, slag, glass or other similar material or combination thereof for use in the production of high quality mineral wool fibers is disclosed. The apparatus includes a cupola to which is charged a base support of high temperature lump refractory material to serve as a permeable support for the slag charge. Gas-fired burners located along the side walls of the cupola below the upper level of the bed of lump refractory material produce hot combustion gases which move through the refractory bed and upward through the slag, melting it in the lower regions and preheating it in the upper part of the cupola. A water-cooled notch can be located at the bottom of the cupola to allow a pool of molten slag to accumulate, so that particles of unmelted slag which reach the bottom of the cupola will melt prior to being discharged from the cupola. The lump refractory material is selected for its high temperature and high load-bearing properties.

15 Claims, 2 Drawing Figures

PATENTED APR 25 1972

3,658,307

INVENTORS
CHARLES DELTON RICHARDSON
ROBERT JOHN CORSENTINO, JR.
OLIVER MAXWELL GOULD
BY
Martha L. Ross
AGENT

PROCESS AND APPARATUS FOR MELTING SLAG

BACKGROUND AND SUMMARY OF THE INVENTION

This invention relates to a process and apparatus for melting slag or other mineral wool producing material. More particularly, this invention relates to a gas-fired cupola and a method of melting slag using the cupola which contains a permeable support of high temperature, high load-bearing lump refractory material, through which combustion gases move to melt the slag which is supported on the refractory material so that the slag flows down through the refractory material and out of the cupola at its lower end in a uniform molten form, suitable for spinning into high quality mineral wool fibers.

The production of mineral fibers, such as mineral wool, requires the melting of the raw material which is rock, slag, glass or other similar material or combination thereof prior to forming such materials into the mineral fibers. Typical prior art apparatus for the melting of such materials has included water cooled metal cupolas in which the raw slag material is heated in the presence of air and a suitable fuel such as coke. The cupola is generally charged in alternate layers of coke and slag. In such prior art cupolas, the coke is frequently used not only as a source of fuel but also as a support for the slag charge. Such coke-fired cupolas are expensive to operate, due to the relatively high cost of coke, and the mineral wool fibers made from slag produced in such cupolas is often of inferior quality due to the high carbon content of such slag.

By the present invention, there is provided an efficient process for the production of a uniform molten slag suitable for forming into mineral wool fibers of high quality. The term "slag" is used herein and in the claims to describe any of the various raw mineral materials, such as rock, slag, glass or other similar well-known materials, used in the production of mineral wool and other mineral fibers. The present invention involves the use of a gas-fired cupola in conjunction with a bed of high temperature, high load- bearing lump refractory material to produce a uniform molten slag, suitable for forming mineral wool fibers of high quality. A permeable bed of the lump refractory material is laid down at the bottom of the cupola to provide a permeable support for the slag charge. Gas burners are situated around the lower extremity of the cupola and open directly into the refractory bed. The upper level of the bed of refractory material extends above the gas burners with the result that a uniform high temperature can be achieved throughout the refractory bed. The particular refractory bed temperature employed will depend on the nature of the raw materials which are being reduced to the melted form. Typical temperatures employed include a range of about 2,500° to 3,000° F. The hot combustion gases produced by the gas burners move upward from the refractory bed through the slag, melting the slag in the lower regions and preheating it in the upper part of the cupola. In heating the slag sufficiently to allow it to flow in a molten form, much of the heat transfer to the slag takes place within the refractory bed. Thus sufficient heat is provided to cause the slag located at the interface with the refractory bed to begin to flow down through the bed. As the slag moves downward through the bed, additional heat is added to produce a molten slag having the desired low viscosity for spinning. As the slag melts, it moves downward through the refractory bed and collects at the bottom of the cupola. A water-cooled notch located in the inner base of the cupola is provided for discharge of the molten slag from the cupola. The opening in the discharge notch is situated above the bottom of the cupola to allow a pool of molten slag to accumulate prior to discharge, so that any particles of unmelted slag which reach the bottom of the cupola will melt prior to being discharged from the cupola. By using gas as a fuel rather than coke, the carbon content of the slag can be held to a minimum, thus improving the quality of the fiber. The use of gas also results in a less expensive operation as well as a reduction in the emission of air pollutants.

Referring now to the drawings.

DESCRIPTION OF THE PREFERRED EMBODIMENTS

Figures 1, 2:
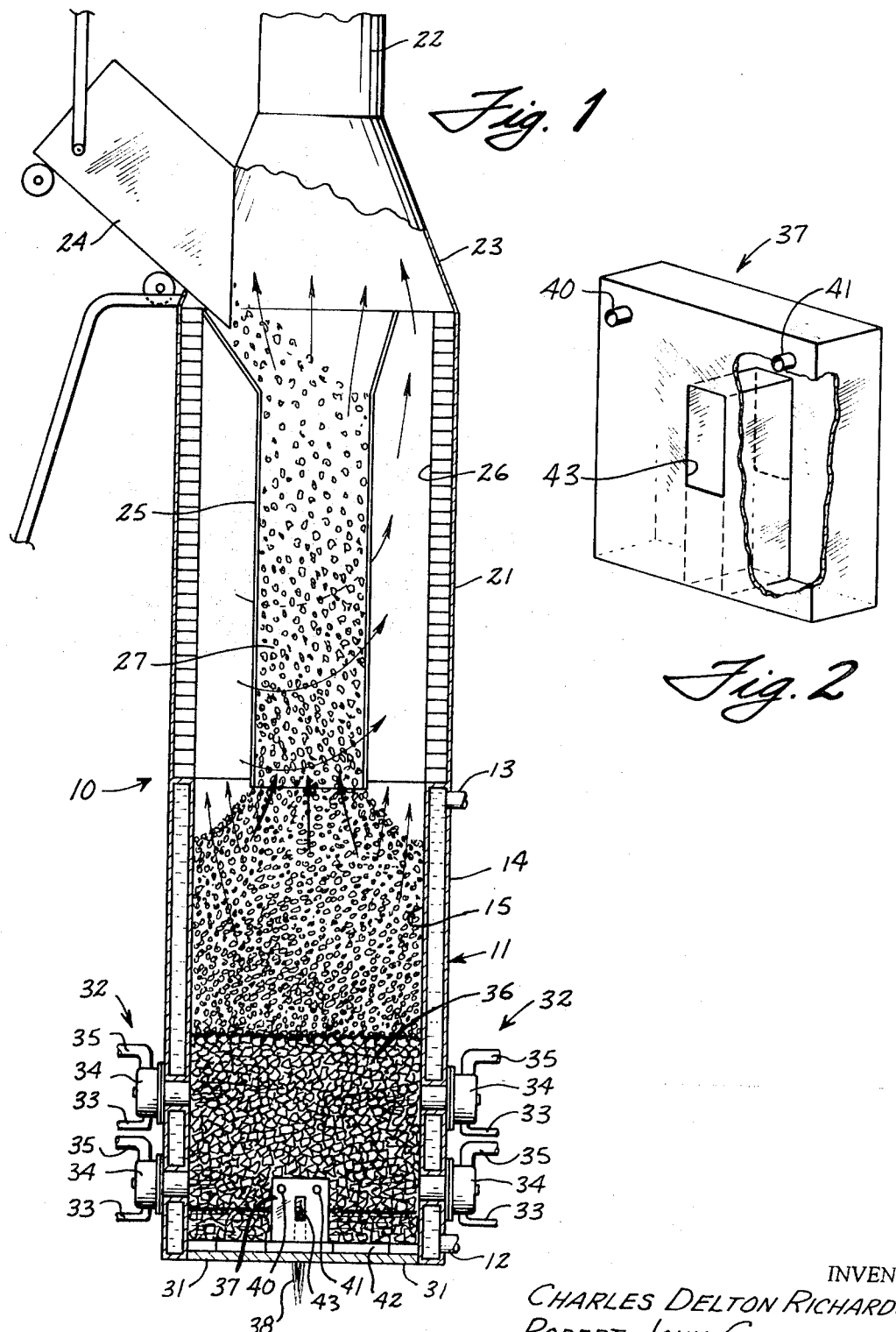
FIG. 1 is a vertical section of a cupola constructed according to the principles of the present invention.
FIG. 2 is a perspective view with cut-away section of the water-cooled discharge notch which is mounted in the bottom of the cupola to provide for discharge of the molten slag.

In the embodiment of the present invention as shown in FIG. 1, apparatus 10 is provided for melting slag which includes a water-cooled cupola 11 having a water inlet 12 at the bottom and a water outlet 13 at the top of the cupola. A cupola of any convenient size may be employed; a cupola having an inner diameter of 5 feet has been used with good results. The cupola has an outer shell 14 and an inner shell 15, each shell being made of steel or other similar material, with space between for the circulation of water. A charging hood 21 located above and connected to the upper part of the cupola 11 provides a storage area for the preheating of the raw slag material. The hood also serves as a discharge duct for the products of combustion. The charging hood 21 is connected to a stack 22 through a conical section 23. A skip bucket 24 delivers the refractory support material 36 and raw slag material 27 to the charging magazine 25 located within the charging hood 21. The charging hood 21 is lined with refractory material 26. Heavy duty hinged doors 31 of steel or a similar material are located at the lower end of the cupola. These doors are so constructed as to allow the cupola to be emptied of lump refractory support material and slag at the end of an operating period. Gas burners 32 are provided along the sidewalls around the circumference of the cupola. Gas lines 33 are provided to deliver gas at preset pressure and volume to the gas burner mixing housings 34 while combustion air ducts 35 deliver air to the gas burner mixing housings. The cupola is filled to a level above the uppermost gas burners, as for example, to a level about 6 to 8 inches above the upper row of gas burners 32 with a high temperature, high load-bearing, lump refractory material 36 so that the hot combustion gases are introduced directly into the refractory bed. An example of such a material is the aluminum oxide refractory bed support sold by The Carborundum Company having a lump size of 2 to 3 inches, a melting point of approximately 3,700° F. and with the following analysis:

| | |
|---|---|
| $Al_2O_3$ (by difference) | 99.53% |
| $SiO_2$ | 0.04% |
| $Fe_2O_3$ | 0.10% |
| $Na_2O$ | 0.33% |

The refractory material should have a lump size which will allow combustion gases and the molten slag to move through the refractory bed while the size should be small enough to prevent the unmelted slag from falling through the bed. A refractory material having a lump size of about 1 to 4 inches is often employed. The refractory material should also be able to support heavy slag loads while being subjected to the high temperatures which are employed within the refractory bed. Typically, a bed of the refractory material should be able to support a load of at least about 10,000 pounds while heated to temperatures in the range of 2,500° to 3,000° F. The gas burners 32 provided along the lower side wall of the cupola are situated so as to open directly into the refractory support bed 36. A water-cooled steel discharge notch 37 is located in the bottom of cupola 11 and is provided with a discharge opening 43 which allows the molten slag 38 to be continuously discharged from the cupola as the slag is melted. This water-cooled discharge notch 37 is also shown in a perspective view in FIG. 2. The discharge notch 37 is provided with an inlet line 40 and an outlet line 41 for cooling water. A layer of carborundum bricks or other high temperature refractory material 42 is closely laid over the lower cupola doors 31 as a protective covering for the bottom of the cupola to withstand the high temperature of the molten slag.

In operation, the lower doors 31 are closed and locked in position and a layer of refractory material 42 laid over the doors. The water circulating system is put into operation and the water cooled notch 37 is then placed and locked in position. The refractory support material 36 is then introduced into the cupola by the skip hoist bucket 24. Sufficient refractory material is delivered to fill the bottom section of the cupola 11 to a height above that of the upper row of gas burners 32, for example, to about 6 to 8 inches above the uppermost burners. The lower row of burners are then fired one at a time until the entire lower row of burners have been ignited. After the lower row of gas burners has burned for approximately one-half hour, the upper row of burners is ignited and the refractory support material 36 is then heated for approximately 2 hours until a temperature of, for example, about 2,500° – 3,000° F. is achieved throughout the support material. When this temperature has been reached, the raw slag material 27 is then introduced into the cupola. During the initial heat-up period, the products of combustion have been discharging through the charging hood 21 and the charging magazine 25 and out through the stack 22. The raw slag material 27 is delivered to the cupola by the skip hoist bucket 24. The slag passes through the charging magazine 25 and comes to rest on top of the refractory support bed 36. Charging continues until the cupola 11 and the charging magazine 25 are filled. The heat generated within the refractory bed 36 by the gas burners 32 melts the raw slag 27 adjacent to the refractory bed and preheats the slag 27 in the upper part of the cupola 11 and in the charging magazine 25. The hot combustion gases produced by the gas burners pass through the water-cooled cupola section 11 and some of the gas continues up through the charging magazine 25 while the balance discharges through the space surrounding the charging magazine and out through the stack 22. The discharge opening 43 in the water cooled notch 37 is preferably situated several inches, for example, about 4 to 6 inches above the refractory bottom 42 of the cupola 11 to allow a pool of molten slag to accumulate in the bottom of the cupola 11 prior to the initial flowing of the molten slag 38 out of the cupola. In this manner, any small particles of unmelted slag which reach the slag pool will melt in the pool and mix with the other molten slag prior to discharging from the cupola. The raw slag material 27 can be charged continuously to the cupola 11 and the molten slag 38 will flow continuously from the cupola as long as the burners 32 deliver sufficient heat.

From the foregoing description, it is apparent that the apparatus of the present invention can be installed in cupolas presently in operation to provide a uniform molten slag of high quality. Additional advantages include the elimination of coke, and the substitution of the much cheaper gas fuel with the resulting lower end cost of the product produced. In addition, material handling costs are reduced. The elimination of coke also reduces pollution emission, with an accompanying reduction in the cost of air pollution corrective equipment.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A process for melting slag which comprises:
 a. charging a cupola having gas heating means with a lump refractory material to form a refractory bed having an upper level above that of the gas heating means, said refractory material having a melting point above that of the slag to be melted,
 b. heating the lump refractory material by directly injecting the combustion gases of the gas heating means into the refractory bed mass,
 c. charging slag to the cupola, whereby said slag rests on said refractory material,
 d. passing heat from the heated bed of refractory material into the slag to melt it so that the slag flows through and is further heated in the bed of refractory material, and
 e. withdrawing the melted slag from the bed of refractory material.

2. The process of claim 1 in which the gas heating means comprises at least one row of gas burners arranged around the lower extremity of the cupola and opening directly into the lump refractory material within the cupola.

3. The process of claim 2 in which the lump refractory material is charged to a level about 6 to 8 inches above the level of the gas heating means.

4. The process of claim 3 in which the lump refractory material comprises an aluminum oxide support having a lump size of about 1 to 4 inches.

5. The process of claim 3 in which the lump refractory material is heated to a temperature in the range of about 2,500° to 3,000° F.

6. The process of claim 1 including means for accumulating the melted slag in the bottom of the cupola.

7. Apparatus for melting slag which comprises:
 a. a refractory chamber,
 b. a high load-bearing, lump refractory material filling said refractory chamber, said refractory material having a melting point above that of the slag to be melted,
 c. gas means for providing heat to the refractory chamber, said gas means being located below the upper level of the refractory chamber and positioned to inject its combustion gases directly into the refractory material mass,
 d. a chamber located above the refractory chamber, communicating with the refractory chamber and adapted to be filled with slag, and
 e. an opening for the discharge of melted slag.

8. The apparatus of claim 7 in which the gas means comprises at least one row of gas burners arranged around the lower extremity of the refractory chamber and opening directly into the interior of the refractory chamber.

9. The apparatus of claim 8 including means for accumulating the melted slag in the bottom of the refractory chamber.

10. A process for melting slag in a cupola where said cupola is provided with a plurality of gas burners at the lower portion thereof, comprising:
 a. charging said cupola with a lump refractory material to form a permeable bed of refractory material, the upper level of said bed lying above that of said gas burners, said refractory material having a melting point above that of the slag to be melted,
 b. heating said bed by injecting the hot combustion gases from said burners directly into the refractory bed mass to provide a temperature level in said bed sufficient to melt slag,
 c. charging slag to said cupola whereby said slag rests on said bed of refractory material,
 d. passing heat from said bed to said slag to initiate flowing of said slag into said bed,
 e. heating said slag while in said bed into a molten state, and
 f. withdrawing the melted slag from said bed.

11. A process as claimed in claim 10 wherein the step of heating said bed elevates the temperature of said bed to the range of about 2,500° to 3,000° F.

12. A process as claimed in claim 11 wherein the step of charging said cupola with lump refractory material results in an upper bed level at least 6 inches above said gas burners.

13. A cupola for the melting of slag comprising:
 a. a refractory chamber,
 b. a permeable bed of lump refractory material filling said refractory chamber, said refractory material having a melting point above that of the slag to be melted,
 c. a second chamber for retaining the slag to be melted, said second chamber being positioned upstream of said refractory chamber and in communication therewith,
 d. means for providing gas-fuel-fired heat directly into said refractory chamber, said means being spaced about and opening into said refractory bed to inject its combustion gases directly into the refractory material mass, whereby said means will heat said bed to a level sufficient to melt slag, and
 e. an opening in said refractory chamber for the discharge of melted slag.

14. A cupola as claimed in 13 wherein said providing means includes a plurality of gas burners spaced about and opening directly into said refractory bed.

15. A cupola as claimed in claim 14 further comprising:
 a. a charge of slag in said second chamber,
 b. said bed of lump refractory material serving as a support bed for said slag.

* * * * *